United States Patent
Rogers et al.

(10) Patent No.: US 7,711,923 B2
(45) Date of Patent: May 4, 2010

(54) PERSISTENT FLASH MEMORY MAPPING TABLE

(75) Inventors: Andrew Rogers, Seattle, WA (US); Sachin C. Patel, Bellevue, WA (US); Yadhu N. Gopalan, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 375 days.

(21) Appl. No.: 11/473,601

(22) Filed: Jun. 23, 2006

(65) Prior Publication Data
US 2007/0300037 A1    Dec. 27, 2007

(51) Int. Cl.
G06F 9/26   (2006.01)
G06F 9/34   (2006.01)
G06F 13/00  (2006.01)
G06F 13/28  (2006.01)

(52) U.S. Cl. .................... 711/206; 711/103; 711/221
(58) Field of Classification Search .............. 711/206
See application file for complete search history.

(56) References Cited

U.S. PATENT DOCUMENTS

| | | | | |
|---|---|---|---|---|
| 6,000,006 A * | 12/1999 | Bruce et al. | ............... | 711/103 |
| 6,377,500 B1 * | 4/2002 | Fujimoto et al. | ....... | 365/230.01 |
| 6,510,488 B2 * | 1/2003 | Lasser | ...................... | 711/103 |
| 2003/0163630 A1 * | 8/2003 | Aasheim et al. | ............ | 711/103 |
| 2003/0189860 A1 * | 10/2003 | Takeuchi et al. | ........... | 365/200 |

* cited by examiner

*Primary Examiner*—Matt Kim
*Assistant Examiner*—Edward J Dudek
(74) *Attorney, Agent, or Firm*—Woodcock Washburn LLP (57) ABSTRACT

Flash memory is accessed via mapping tables comprising a master mapping table and at least one secondary mapping table. The master mapping table contains indexes to the secondary mapping tables. The secondary mapping tables contain indexes to locations in the flash memory. The mapping tables are maintained in the flash memory. Upon initialization subsequent a safe power shutdown, the master mapping table is cached and secondary mapping tables are cached as needed. Upon initialization subsequent an unsafe power shutdown, the mapping tables are constructed in accordance with a multiple-phase process. In an example embodiment, the multiple-phase process comprises locating all the secondary mapping tables stored in the flash memory, determining which secondary mapping tables are valid, determining which secondary mapping tables are invalid, determining which sectors of the flash memory are free, and constructing the master mapping table and the secondary mapping tables from this information.

19 Claims, 8 Drawing Sheets

PERSISTENT FLASH MEMORY MAPPING TABLE

TECHNICAL FIELD

The technical field generally relates to electronics and specifically to memory management.

BACKGROUND

The use of flash memory is becoming more prevalent and the amount of information storable in flash memory is increasing. Flash memory is a form of electrically erasable programmable read only memory (EEPROM). Unlike typical EEPROM, which is erasable one byte at a time, flash memory is capable of being erased one block at a time. Block sizes vary for various flash memory devices. Flash memory devices are typically small, light weight, and consume low amounts of power. Thus, flash memory is appropriate for devices such as mobile devices, laptop computers, battery powered devices, devices desiring low power consumption, and/or small devices, for example.

Typically, a flash device is inserted into a device such as a processor, and the processor interfaces with the flash device as though it were a disk memory. Flash devices also can be incorporated onto circuit boards, such as on a motherboard of a processor. Typical flash devices contain a mapping table for mapping to addresses on the flash memory. The mapping table is stored in the flash device on random access memory (RAM). The mapping table is typically generated upon initialization (e.g., when power is applied to the flash device when it is plugged into a processor) and the mapping table is typically lost when power is removed from the flash device (e.g., when it is unplugged from the processor). The flash memory is usually scanned to generate the mapping table. As the amount of information that can be stored in flash memory increases, the amount of RAM needed to store the mapping table will become too large for current devices. Also, the process of scanning the flash memory upon initialization can increase the amount of time needed to boot up the flash device.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A mapping table for managing flash memory includes a master mapping table and at least one secondary mapping table. The master mapping table contains indexes to the secondary mapping tables. The secondary mapping tables contain indexes to locations in the flash memory. The master mapping table is maintained in the flash memory. During operation, the flash memory is accessed via the master mapping table and appropriate secondary mapping tables. Upon initialization (power-up) of the flash device, the master mapping table is analyzed to determine if it is valid. If the master mapping table is valid, it is loaded into cache storage (cached), such as random access memory (RAM) of the flash device. Secondary mapping tables are also analyzed to determine their validity. If the secondary mapping tables are valid, individual secondary mapping tables are cached as needed. If, however, the master mapping table is determined to be invalid, e.g., incomplete and/or inconsistent, the master mapping table, and secondary mapping tables as appropriate, are constructed from information stored in the flash memory. A master mapping table could become invalid, for example, due to the flash device suffering an unsafe power shutdown or interruption.

During operation, the cached master mapping table is the working copy of the master mapping table. The copy of the master mapping table that is maintained in the flash memory is updated from the cached version. In an example embodiment, the master mapping table maintained in the flash memory is updated when the flash device (e.g., the CPU of the flash device) is idle and/or when the master mapping table is not being utilized to access a location in the flash memory.

If the cache is full when a secondary mapping table is to be cached, one of the cached secondary mapping tables is evicted to make room for the secondary mapping table to be cached. In one example embodiment, the least frequently used secondary mapping table is evicted to make room for the new secondary table. In another example embodiment, the least recently used cached secondary table if evicted.

BRIEF DESCRIPTION OF THE DRAWINGS

The foregoing summary, as well as the following detailed description, is better understood when read in conjunction with the appended drawings. For the purpose of illustrating a persistent flash memory mapping table, there is shown in the drawings exemplary constructions thereof; however, a persistent flash memory mapping table is not limited to the specific methods and instrumentalities disclosed.

DETAILED DESCRIPTION OF ILLUSTRATIVE EMBODIMENTS

Figure 1:
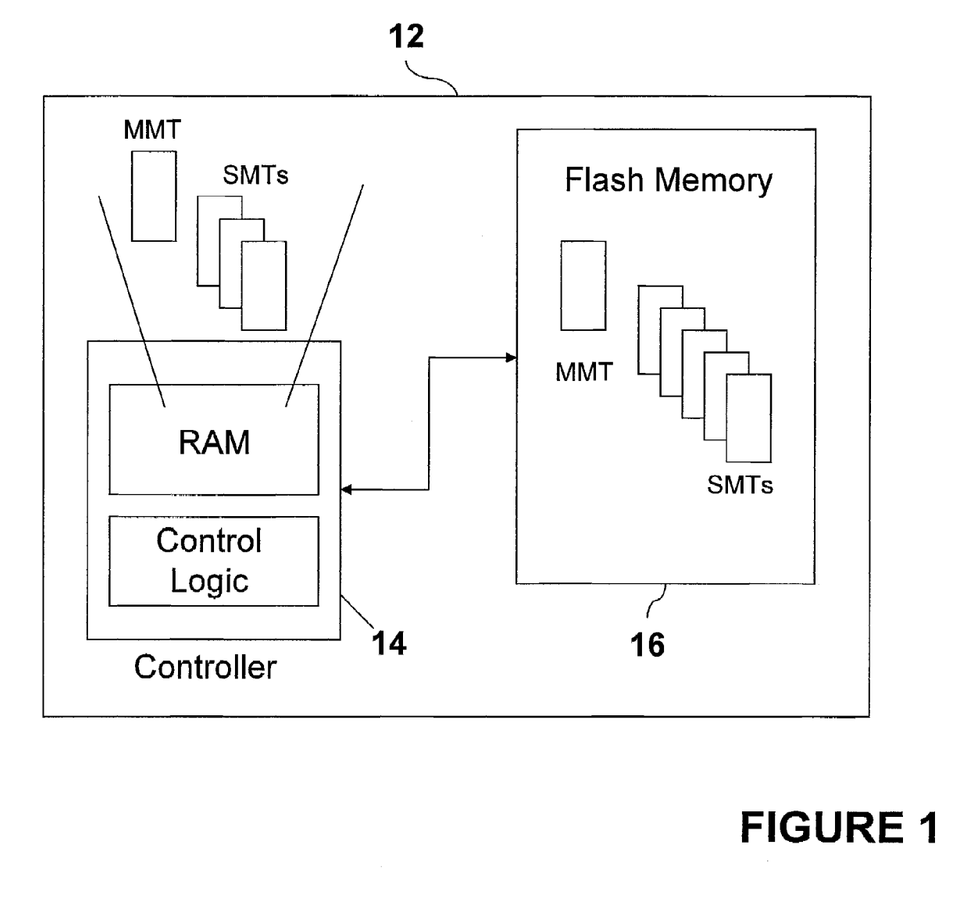
FIG. 1 is an illustration of a flash device comprising a master mapping table and secondary mapping tables.

FIG. 1 is an illustration of a flash device 12 comprising a master mapping table (MMT) and secondary mapping tables (SMTs). The flash device 12 comprises a controller 14 and flash memory 16. The controller 14 comprises control logic and working memory such as random access memory (RAM). As described in more detail below, the flash memory 16 is accessed via mapping tables. The term "access" as used herein comprises read, write, erase, or a combination thereof. Persistent memory mapping for flash memory utilizes a multiple level mapping approach. In an example configuration, the memory mapping table comprises a master mapping table and at least one secondary mapping table. The master mapping table comprises pointers to each of the secondary mapping tables. Each secondary mapping table maps to a sector (or page) of flash memory 16. The master mapping table is stored in flash memory 16 (persistent) and loaded into working memory (cached) upon initialization of the flash device 12. The master mapping table stored in flash memory 16 is updated from the cached master mapping table during an idle period and/or at the occurrence specific events. An idle period can comprise a period of time during which the flash device (e.g., a CPU of the flash device) is idle, a period of time when the master mapping table is not being utilized to access a location in the flash memory 16, or a combination thereof. Secondary tables are stored in flash memory 16 and cached as needed. If the flash device 12 experiences a safe power shutdown, upon subsequent initialization (power up), the master mapping table is loaded from the flash memory 16 into working memory, e.g., RAM, of the flash device 12 and the secondary mapping tables are loaded from the flash memory 16 into working memory as needed. If the flash memory device 12 experiences an unsafe power shutdown, the mapping tables are constructed in accordance with a multiple-phase process. In an example embodiment, the multiple-phase process comprises locating all the secondary mapping tables stored in the flash memory 16, determining which secondary mapping tables are valid, determining which secondary mapping tables are invalid, determining which sectors of the flash memory 16 are free, and constructing the master mapping table and the secondary mapping tables from this information.

A persistent flash memory mapping table is described herein as applied to flash memory. However, it is to be understood that the application of a persistent flash memory mapping table as described herein should not be limited thereto. The herein described persistent flash memory mapping table is applicable to any appropriate type of storage means, such as NAND flash memory, NOR flash memory, non-flash memory, dynamic memory, volatile memory, nonvolatile memory, semiconductor memory, magnetic memory, hard disk memory, floppy disk memory, optical memory, or the like, for example.

Flash memory comprises a fixed number of blocks. Each block comprises a fixed number of pages, or sectors. Each page comprises a fixed number of bytes. Before data can be written into flash memory, memory must be erased. More specifically, before a block can be used for writing, the block must be erased. Flash memory can be written a page at a time. Flash memory is erased a block at a time. Thus, erase operations are performed on a block basis, and program (write) operations are performed on a page basis. Read operations also are performed on a page basis. Flash memory is accessed via a driver, which accepts reads and writes in units of sectors (which can equate to pages in the flash memory). In a brute force implementation the driver could write data directly to the physical sector address on the flash memory corresponding to the logical sector associated with the flash device. This implementation however, could require an entire block to be erased during every write process, which would be slow and would unevenly wear the flash. Thus, repeated writes to the same logical sector are written to a different physical sector location of the flash memory and the old physical sector location is marked as dirty, meaning it is no longer in use and can be reclaimed. A logical sector address refers to the address that is exposed to the flash device, such as the upper layers of a storage stack, a partition on the driver, and/or a file system, for example. The physical sector address is the physical location in flash memory where the data is stored. Mapping tables are used to map between logical sectors and physical sectors.

Figure 2:
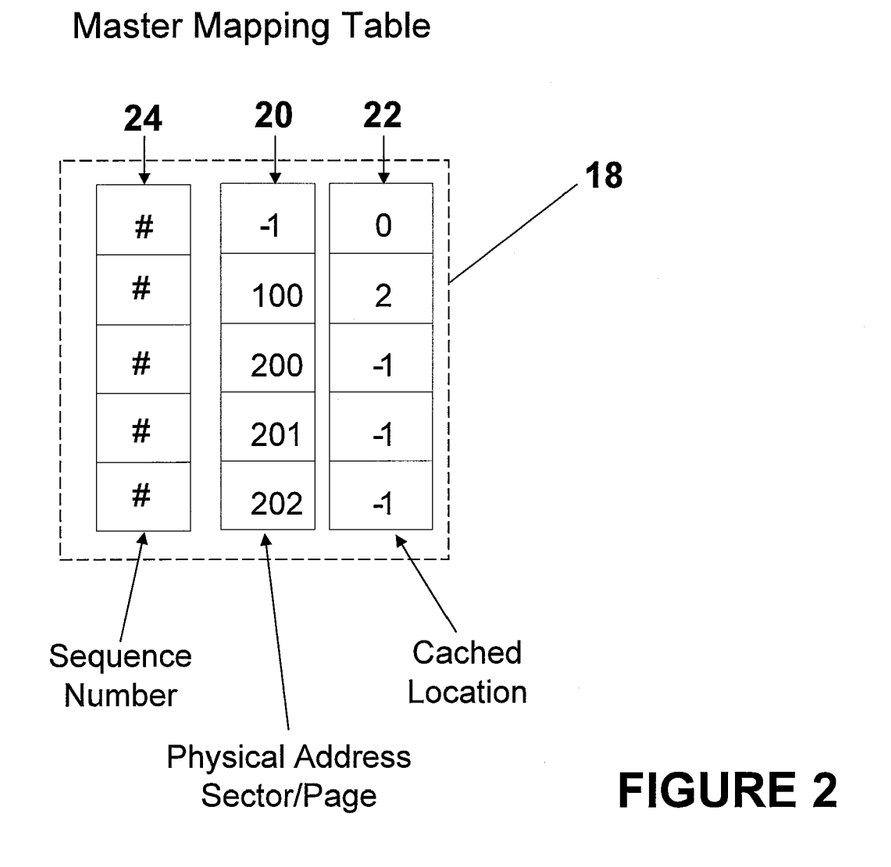
FIG. 2 is an illustration of an example master mapping table.

FIG. 2 is an illustration of an example master mapping table 18. The master mapping table 18 comprises pointers to secondary tables (secondary tables not shown in FIG. 2). In an example configuration, the master mapping table 18 comprises three arrays 20, 22, 24. Array 20 contains pointers, or indexes, to locations (physical addresses) of secondary tables in flash memory and array 22 contains pointers, or indexes, to locations of secondary tables in cache. The cache can comprise any appropriate storage means, such as the RAM of the flash device. A value of minus one (−1) in array 20 indicates the corresponding secondary mapping table is dirty, and that the corresponding copy of the secondary mapping table on the flash memory is no longer valid. A value of minus one (−1) in array 22 indicates that the corresponding secondary table is not stored in cache. It is to be understood that any appropriate values can be used to indicate that a secondary mapping table is dirty and/or that a secondary mapping table is not cached. In an example configuration, the master table 18 comprises array 24 that is used for storing maximum sequence numbers. As described in more detail below, maximum sequence numbers are used during initialization when scanning the flash memory to determine the validity of secondary mapping tables. Sequence numbers are used to determine, given two or more physical sectors with the same logical sector, which physical sector contains the most recent version of the logical sector. A sequence number is incremented every time a new sector is written. Therefore, the sector with a higher sequence number is the more recent.

Figure 3:
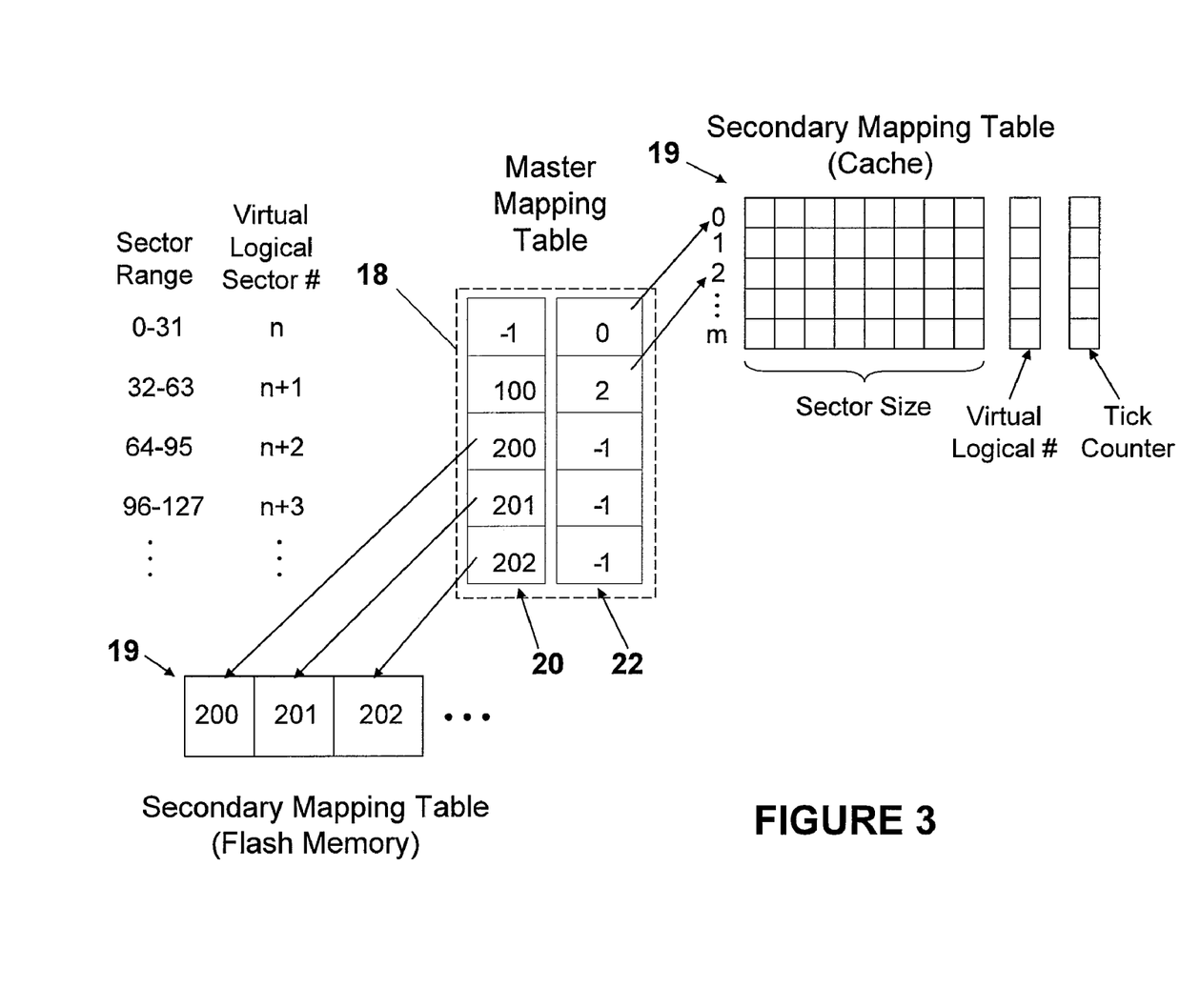
FIG. 3 is an illustration of a flash memory mapping data structure.

FIG. 3 is an illustration of a flash memory mapping data structure comprising the master mapping table 18 and secondary mapping tables 19. The upper right corner of FIG. 3 depicts secondary mapping tables 19 stored in cache. The secondary mapping tables are labeled 0 through m. The lower left corner of FIG. 3 depicts secondary mapping tables 19 stored in flash memory. The numbers (200, 201, 202) in the lower left corner depiction represent the location in flash memory of corresponding secondary mapping tables.

A portion of the memory of the flash device, such as the RAM, is used to store copies of the secondary tables during operation of the flash device. Copies of the secondary tables are loaded from the flash memory into cache as needed, and as described in more detail below, secondary tables are updated in the flash memory as needed. As shown in FIG. 3, in an example configuration, the cache comprises an array of secondary tables, depicted as 0 through m. Each secondary table is equal to the size of a sector in flash memory. In an example embodiment, a secondary table comprises a tick counter. The tick counter of a respective secondary table is updated (e.g., incremented) each time the respective secondary table is accessed. Secondary mapping tables are cached to facilitate accessing the flash memory. In an example embodiment, a limited amount of working memory is allocated for storage of secondary mapping tables. When all of the cache slots are full and a new secondary table is to be loaded from flash memory, a secondary table is evicted to allow loading of another secondary mapping table. The tick counter is used to facilitate the determination as to which secondary table to evict. That is, the tick counter is used to facilitate where to store secondary tables read in from flash memory into the cache memory (referred to as paging in the secondary mapping tables). In one example embodiment, the least frequently used (LFU) secondary mapping table is evicted to make room for the new secondary table. In accordance with the LFU policy, the cached secondary table with the smallest access count will be evicted. In another example embodiment, the least recently used cached secondary table if evicted. That is, the cached secondary table having the greatest amount of time since the most recent time it was accessed is evicted.

Figure 4:
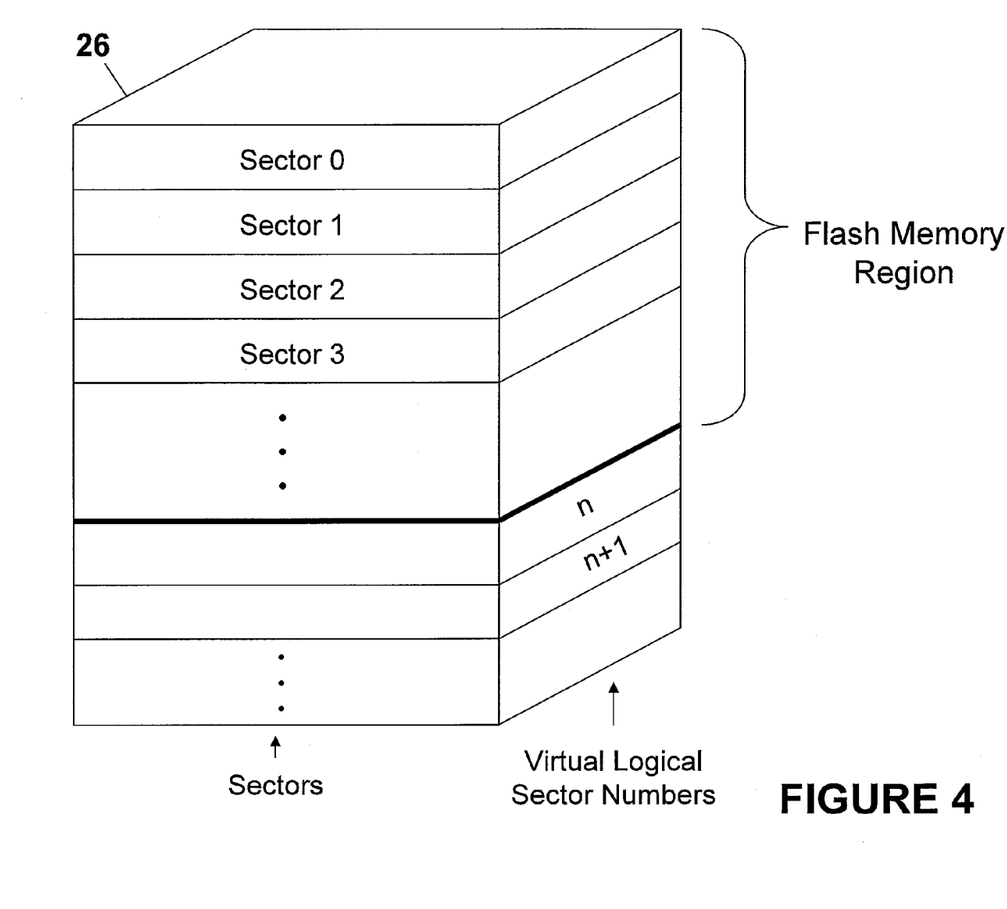
FIG. 4 is an illustration an example flash memory showing sectors and virtual logical sector numbers.

FIG. 4 is an illustration an example flash memory 26 showing sectors and virtual logical sector numbers. With reference to both FIG. 3 and FIG. 4, the master mapping table 18 is indexed to the flash memory 26 based on virtual logical sector numbers (virtual logical #). The virtual logical sector numbering extends past the actual logical sector range in the region of the flash memory starting with n, where n is the number of logical sectors in the region. A region refers to a region of flash memory that the driver is managing. The number of logical sectors (n) in the region is determined by taking the number of physical sectors in the region and subtracting the number of reserved sectors required for the flash driver operation (referred to as compaction). The purpose of the virtual logical sector number is to provide means for identifying the secondary mapping tables in the master mapping table. The numbering begins at "n" to avoid the sector numbers conflicting with a valid logical sector number. Any number that is greater than or equal to "n" is an invalid logical sector number. Each virtual logical sector number corresponds to a range of actual logical sectors in the flash memory 26 and the mapping for these actual logical sectors is specified in the secondary mapping tables. A sector range can be any appropriate number of sectors. In an example configuration, as depicted in FIG. 3, a sector range is 32 sectors. In an example embodiment, each secondary mapping table is the size of a single sector. In an example embodiment, each secondary mapping table comprises a reference to the master mapping table via a virtual logical number, depicted as virtual logical # in FIG. 3. The virtual logical number of a secondary mapping table is utilized to determine the physical range of sectors mapped by that table. As depicted in FIG. 4, the virtual logical sector numbers starting at "n" are contiguous within the flash memory 26. This depiction, however, is exemplary. In an example embodiment, virtual logical sector numbers are greater than the highest physical sector number in the region (N). The physical location of the mapping tables can be anywhere in the flash memory. The physical locations are identified by their respective virtual logical number, not their physical location.

During initialization, when power is applied to the flash device, the flash memory is scanned to determine if the master mapping table stored therein is complete and consistent (valid). If the master mapping table is determined to be complete and consistent, which is an indication that the previous power shutdown was safe, the master mapping table is loaded into cache for subsequent use. If the master mapping table is determined to be incomplete and/or inconsistent (previous power shutdown unsafe), the master mapping table is constructed in accordance with a multi-phase process.

If a previous power shutdown was not safe, the flash memory is scanned for secondary mapping tables from which the master mapping table is constructed. When a sector containing a secondary mapping table is located (e.g., as determined by the fact that it has a logical sector number greater than N), the virtual logical sector number, the physical sector location, and the sequence number of the located sector are used to construct the master mapping table. The sequence number is compared with a corresponding existing sequence number, if one exists, to determine which is the later version. If the sequence number of the located sector is greater than the existing sequence number, the physical sector location of the secondary table is recorded in the master mapping table.

If a located sector, as determined by the fact that it has a logical sector number less than N, is a data sector (rather than a sector containing a secondary mapping table), the data sector is evaluated to determine if it invalidates any secondary mapping tables. A secondary mapping table is invalidated if the sequence number of the located data sector is greater than the sequence number of the secondary mapping table to which it is being compared. A location in the master mapping table having the same logical sector number as the logical sector number of the located data sector is analyzed. The sequence number of the location in the master mapping table is compared with the sequence number of the data sector. If the sequence number of the data sector is greater than the sequence number of the master mapping table, the secondary mapping table location indexed by the master mapping table is invalidated and the sequence number of the data sector is recorded for subsequent determination of the validity of secondary mapping tables.

Figure 5:
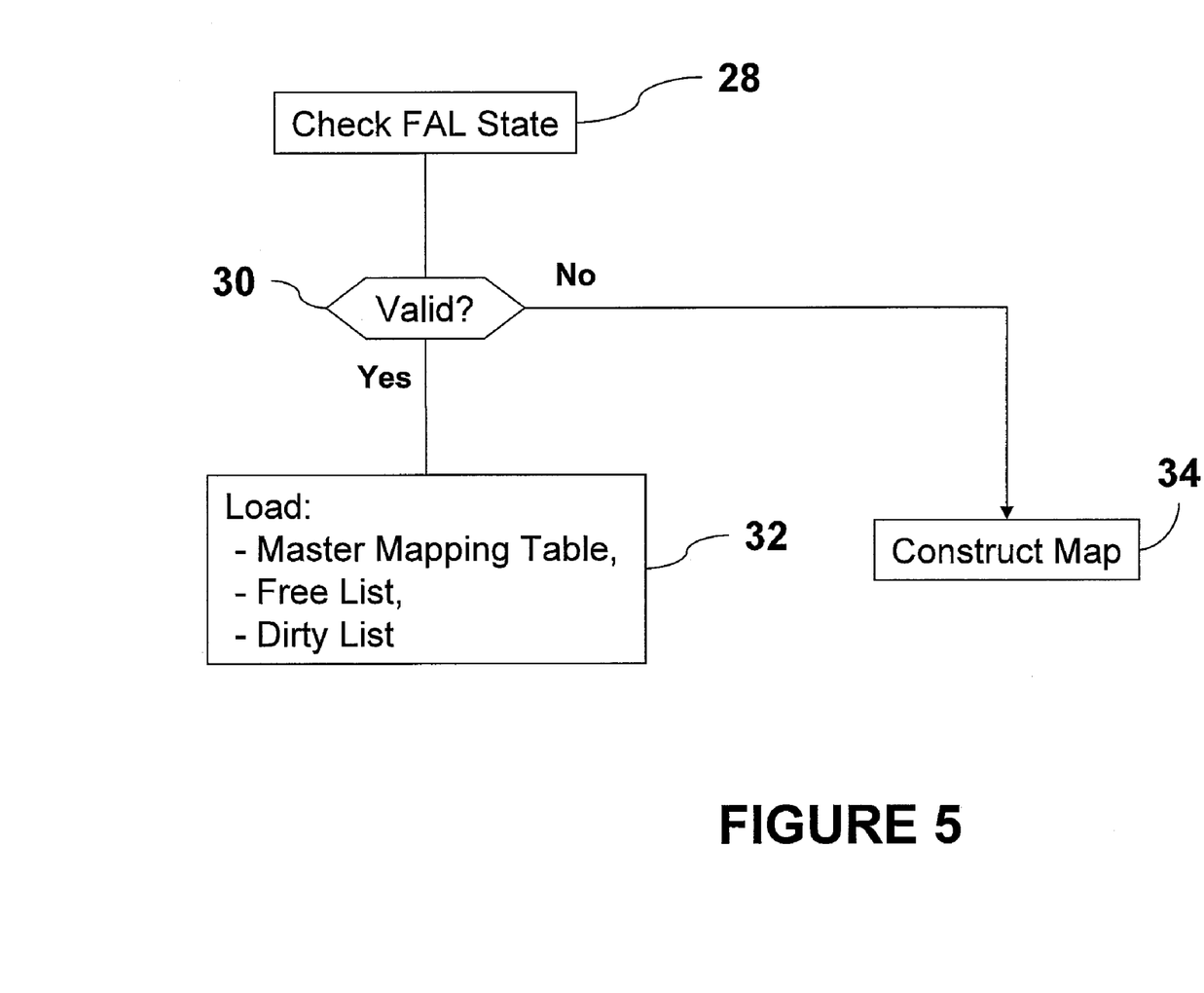
FIG. 5 is a flow diagram of an example process for loading the master mapping table from flash memory.

FIG. 5 is a flow diagram of an example process for loading the master mapping table from flash memory. The master mapping table is loaded into working memory (RAM) during initialization (power up) of the flash device. The flash memory is scanned during initialization to determine the validity of the mapping tables stored therein. To determine the validity of the master mapping table, in an example embodiment, the state of the flash abstract layer (FAL) is checked. The FAL is a translation layer between the flash device and the file system of the component (e.g., laptop, server, camera) utilizing the flash device. The FAL handles various operations. For example, the FAL manages input and output requests from the file system, manages wear leveling operations for the flash memory, and manages power failure scenarios. The FAL also maintains logical to physical sector mapping. The FAL maps the logical sectors utilized by the file system of the component utilizing the flash device to physical sectors on the flash memory. That is, the FAL translates logical sector addresses from the file system into the corresponding physical sector addresses of the flash memory.

The state of the FAL is maintained in the flash memory (e.g., the first block of the flash memory). The FAL state comprises information indicating whether the previous power shutdown was safe or unsafe. The state of the FAL includes information indicative of the validity of the master mapping table. In an example embodiment, various portions of the FAL state are analyzed to determine the validity of the master mapping table stored in the flash memory. For example, a signature of a FAL state header is analyzed, wherein an invalid signature indicates that the master mapping table stored in the flash memory is invalid. Also, in an example embodiment, the FAL state header comprises a physical sector location of the end sector of the FAL state (the FAL state can span multiple sectors). This end sector is analyzed to determine the validity of the master mapping table stored in the flash memory. During normal operation, the master mapping table is invalidated when it is first written to and cleared (valid) when a new master mapping table is written during a safe shutdown. Thus, the end sector is analyzed to determine if the master mapping table is valid. Further, in an example embodiment, the entire FAL state is loaded into working memory and a checksum is generated to determine if the FAL state is valid. If the FAL state is determined to be invalid, the master mapping table is determined to be invalid.

The FAL state is checked at step 28 to determine the validity of the master mapping table. The master mapping table is determined to be valid or invalid in accordance with the FAL state at step 30. If the master mapping table stored in the flash memory is determined to be invalid (step 30), the master mapping is constructed at step 34 (described in more detail below). If the master mapping table stored in the flash memory is determined to be valid (step 30), the master mapping table is loaded into working memory at step 32. A list of free sectors of the flash memory and a list of dirty sectors of the flash memory are also loaded at step 32. Thus once the master mapping table stored in the flash memory has been determined to be valid in accordance with the FAL state header, the free list, dirty list, and the master mapping table are formed into the appropriate objects for storage in the working memory (e.g., RAM).

Figure 6:
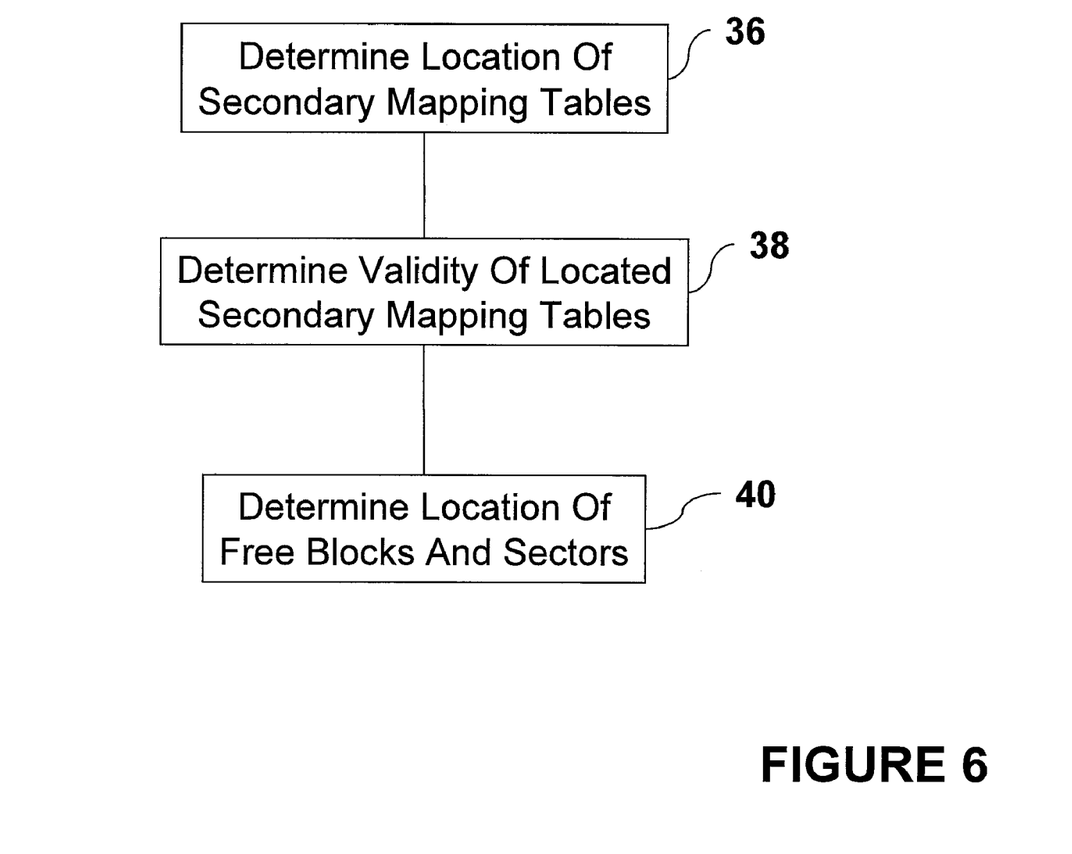
FIG. 6 is a flow diagram of a portion of an exemplary process for constructing a mapping table.

FIG. 6 is a flow diagram of a portion of an exemplary process for constructing a mapping table. If the master mapping table stored in the flash memory is determined to be incomplete and/or inconsistent, the master mapping table is constructed from information obtained from the flash memory. The master mapping table can become inconsistent and/or incomplete as a result of a non-safe power shutdown, a portion of the flash memory failing, or the like. To construct the master mapping table, the flash memory is scanned to determine the location of all secondary mapping tables at step 36. The flash memory also is scanned to determine the validity of the located secondary tables at step 38. At step 40, it is determined which blocks and sectors of the flash memory are free.

Figure 7:
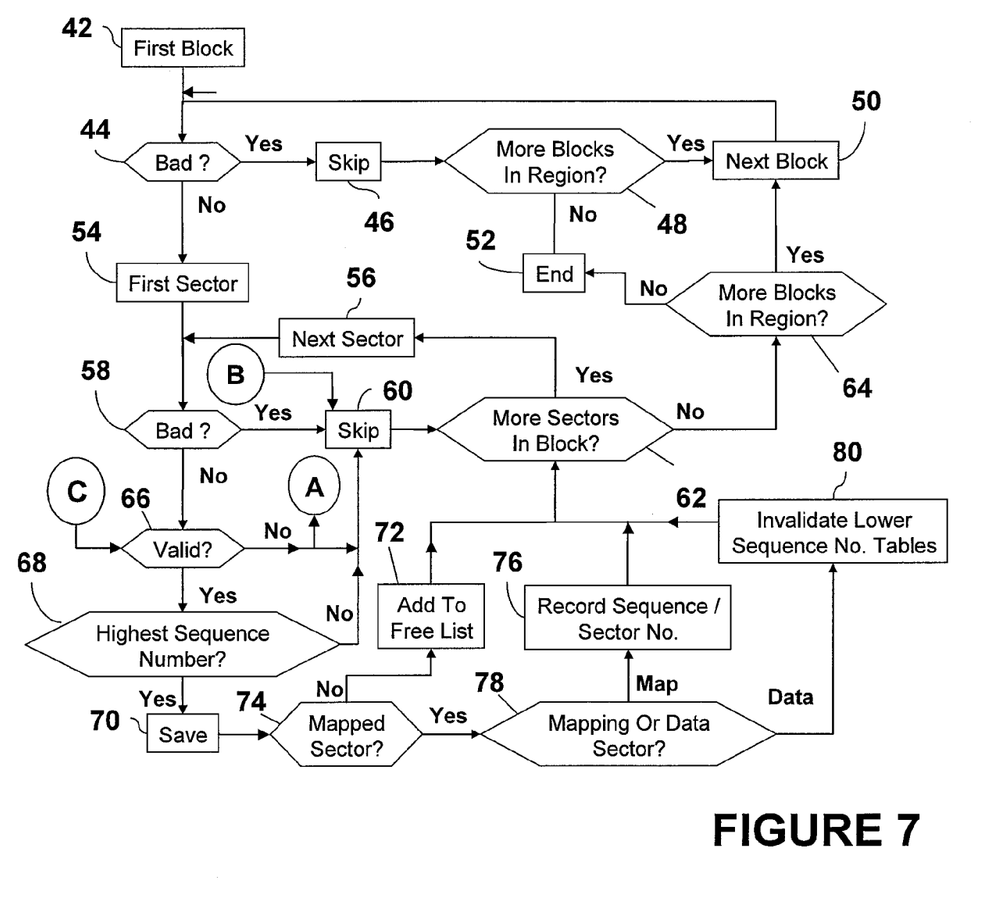
FIG. 7 is a more detailed flow diagram of a portion of an exemplary process for constructing a mapping table.

FIG. 7 is a more detailed flow diagram of a portion of an exemplary process for constructing a mapping table. The blocks and sectors (or pages) of the flash memory are scanned to construct the mapping tables. A first block of the flash memory is checked at step 42. At step 44, it is determined if the block is bad. The block can be determined to be bad in accordance with any appropriate means. If the block is bad (step 44), the block is skipped at step 46 and it is determined, at step 48, if there are any more blocks in the region of flash memory to scan. If there are no more blocks in the region (step 48) the process ends at step 52. If, at step 48, there are more blocks in the region, the process proceeds to the next block at step 50, and it is determined if the block is bad (step 44) as described above.

If, at step 44, it is determined that the block is not bad, the first sector of the block is scanned at step 54. At step 58, it is determined if the sector is bad. If the sector is bad (step 58), the sector is skipped at step 60, and it is determined if there are more sectors in the block at step 62. If there are more sectors in the block (step 62), the process proceeds to the next sector at step 56, and it is determined if the sector (i.e., the block in which the sector belongs) is bad (step 58), as described above. If, at step 62, it is determined that there are no more sectors in the block, it is determined, at step 64, if there are any more blocks in the region of flash memory. If there are no more blocks in the region (step 64), the process ends at step 52. If there are more blocks in the region (step 64), the process proceeds to the next block at step 50, and continues as described above.

If, at step 58, it is determined that the sector is not bad, the validity of the sector is determined at step 66. The validity of the sector can be determined in accordance with any appropriate means. In an example embodiment, the validity of the sector is determined in accordance with a bit (or flag) that is set if the sector is valid and in accordance with a checksum. If the sector is determined to be invalid (step 66), the sector is skipped at step 60, and the process proceeds to step 62 and continues as described above. The control sector is used to log a write transaction. The control sector bit identifies a control sector. The purpose of this step is to determine the highest control sector, so that the last operation can be validated. The purpose of the checksum is to verify that the control sector itself is valid. If the sector is determined to be valid (step 66), it is determined at step 68 if the sequence number of the sector is the highest valued sequence number observed to this point during the scan of the flash memory. If the sequence number of the sector is not the highest valued observed sequence number (step 68), the sector is skipped and the proceeds to step 60 and continues as described above. If the sequence number of the sector is the highest valued observed sequence number (step 68), the physical location of the sector in flash memory (flash memory address of the sector) is saved at step 70, for subsequent utilization.

At step 74, it is determined if the physical location of the sector (sector address in flash memory) is mapped to a logical sector. If the physical location of the sector is not mapped to a logical sector (step 74), the sector is added to the free list at step 72. A free sector is available for use. If the free sector is the first sector in a block, the block in which the free sector resides is added to the free list, indicating that the entire block is free and available for use. The process proceeds to step 62 to determine if there are more sectors in the block, and continues as described above.

If it is determined (step 74) that the physical location of the sector is mapped to a logical sector, it is determined at step 78 if the sector is a mapping table sector or a data sector. In an example embodiment, a sector is determined to be a mapping table sector if its logical sector number extends past the actual logical sector range of the region of flash memory. A mapping table sector stores a secondary table and is identified with a logical sector number that extends past the actual logical sector range. A data sector stores actual sector data and contains a logical sector number that is in the valid range. If the sector is a mapping table sector (step 78) and the sector sequence number is the highest valued observed sector sequence number, physical sector location is recorded (step 76) including the sequence number and sector number of the sector. The process proceeds to step 62 and continues as described above. If the sector is determined to be a data sector (step 78), secondary mapping tables with lower sequence numbers are invalidated at step 80.

Figure 8:
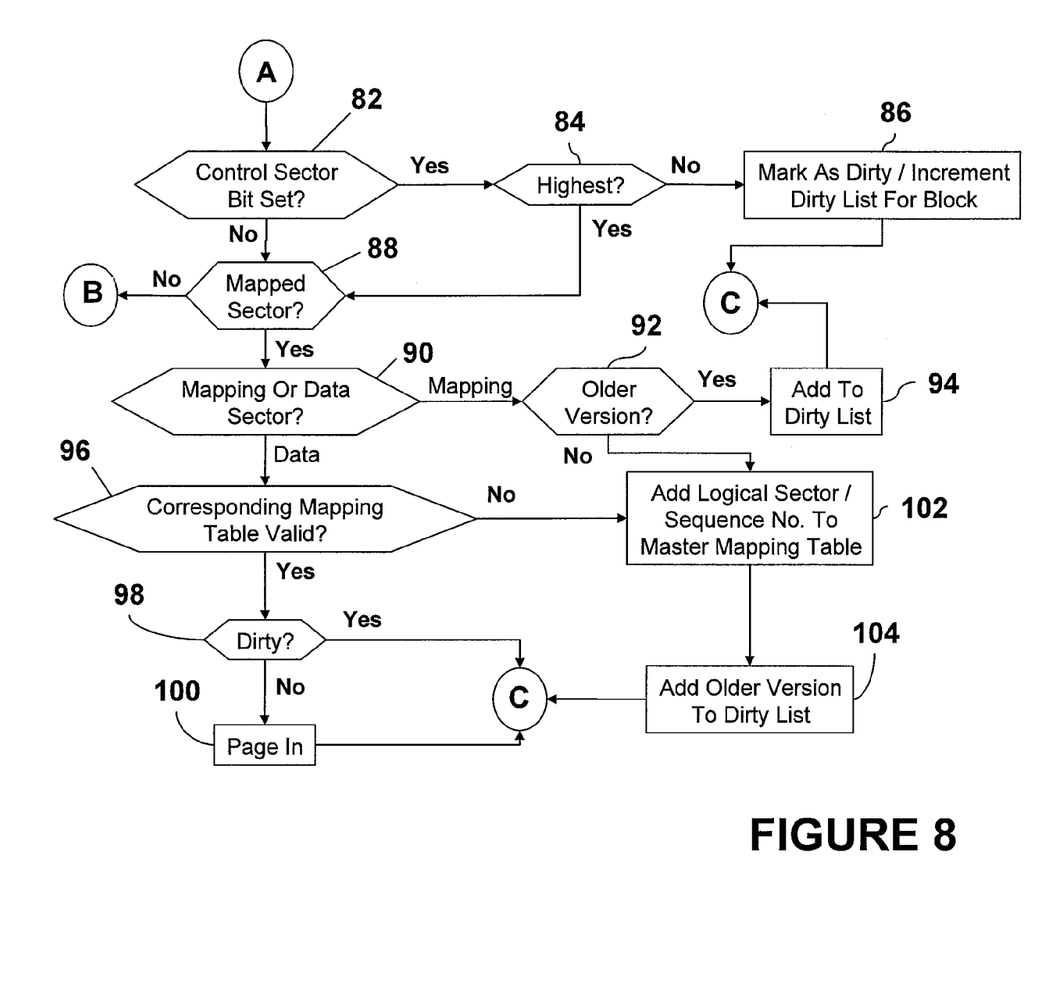
FIG. 8 is flow diagram of an example process for reconstructing secondary mapping tables.

During the process depicted in FIG. 7, if the sector corresponding to a secondary mapping table is determined to be invalid (step 66), the process proceeds to the process depicted by the circled letter "A," which is described in FIG. 8. FIG. 8 is flow diagram of an example process for reconstructing secondary mapping tables. If, at step 66 (in the flow diagram of FIG. 7), a sector is determined to be invalid, the secondary mapping table corresponding thereto is reconstructed. It is determined, at step 82, if a control sector bit is set. A control sector bit that identifies the sector as a control sector. The control sector bit is set when the control sector is written. If the control sector bit is set (step 82), it is determined, at step 84, if the sequence number of the sector is the highest valued sequence number observed to this point during the scan of the flash memory. If the sequence number of the sector is not the highest valued observed sequence number (step 84), the sector is marked as dirty, and the dirty count for the block in which the sector resides, is incremented (step 86). If the sequence number of the sector is the highest valued observed sequence number (step 84), the sector is not marked as dirty, and the process proceeds to step 88.

If, at step 82, it is determined that the control sector bit is not set, it is determined, at step 88 if the sector is a mapped sector. That is, at step 88, it is determined if the physical location of the sector (sector address in flash memory) is mapped to a logical sector. If the physical location of the sector is not mapped to a logical sector (step 88), the process proceed to step 60 (FIG. 7) as indicated by the circled letter "B". If the physical location of the sector is mapped to a logical sector (step 88), it is determined at step 90, if the sector is a mapping sector or a data sector. If the sector is determined to be a mapping table sector (step 90), it is determined, at step 92, if the version of the sector is the older version of this sector. Thus in a first pass, valid secondary mapping table sectors are determined based on the sequence number and they are recorded in the cached master mapping table. In a second pass, the results from the first pass are utilized to build up the master mapping table, to determine whether a particular physical sector is an old version. If the physical sector of the sector does not match what is in the master mapping table from the first pass, then it is an older version and is treated as dirty. If an older version exists, the sector is marked as dirty at step 94, and the process proceeds to step 66 (circled letter "C") and continues as described above. If an older version does not exist (step 92), the logical sector number and the sequence number are added to the master mapping table, at step 102.

If, at step 90, the sector is determined to be a data sector, the validity of the Corresponding secondary mapping table is determined at step 96. This is determined in accordance with the sequence numbers. If the sequence number of the data sector is higher than that of the corresponding secondary mapping table, the secondary mapping table is determined to be invalid. The corresponding secondary mapping table is the secondary mapping table that contains an index to the instant data sector. If the corresponding secondary mapping table is valid (step 96), it is determined, at step 98, if the data sector is dirty or not dirty. The data sector is dirty if its physical sector address does not match what is specified in the secondary mapping table. If the data sector is not dirty, the secondary mapping table may need to be paged in (stored in cache), at step 100, if it is not already cached. The process proceeds to step 66 (circled letter "C") and continues therefrom. If the corresponding secondary mapping table is dirty (step 98), the sector is marked as dirty data in the master mapping table and the process proceeds to step 66 (circled letter "C") and continues therefrom. If the corresponding secondary mapping table stored in flash memory is not valid (step 96), the logical sector number and the sequence number are added to the cached master mapping table, at step 102. In this case, the cache secondary mapping table is being progressively built up, because the secondary mapping table stored in flash memory was invalid. At step 104, if a physical sector that maps to the same logical sector with a lower sequence number exists, the previously mapped physical sector is marked dirty. The process proceeds to step 66 (circled letter "C") and continues therefrom.

While it is envisioned that numerous embodiments of a persistent flash memory mapping table are particularly well-suited for computerized systems, nothing in this document is intended to limit the scope thereof. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for a persistent flash memory mapping table, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for a persistent flash memory mapping table.

The program(s) can be implemented in assembly or machine language, if desired. In any case, the language can be a compiled or interpreted language, and combined with hardware implementations. The methods and apparatuses for a persistent flash memory mapping table also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for a persistent flash memory mapping table. When implemented on a general-purpose processor, the program code combines with the processor to provide a unique apparatus that operates to invoke the functionality of a persistent flash memory mapping table. Additionally, any storage techniques used in connection with a persistent flash memory mapping table can invariably be a combination of hardware and software.

While a persistent flash memory mapping table has been described in connection with the example embodiments of the various figures, it is to be understood that other similar embodiments can be used or modifications and additions can be made to the described embodiments for performing the same functions of a persistent flash memory mapping table without deviating therefrom. Therefore, a persistent flash memory mapping table as described herein should not be limited to any single embodiment, but rather should be construed in breadth and scope in accordance with the appended claims.

What is claimed:

1. A method for managing memory, the method comprising:
    maintaining in persistent storage, a first mapping table and one or more secondary mapping tables, wherein:
        the first mapping table comprises a first index array with indexes to locations of each secondary mapping table stored in the persistent storage and a second index array with indexes to locations of each secondary mapping table stored in a cache storage, and a third array which contains information to determine the validity of each secondary mapping table stored in the persistent storage; and
        each secondary mapping table comprises at least one index to a location in the persistent storage;
    storing in cache storage the first mapping table; and
    accessing a location in the persistent storage via the cached first mapping table and at least one secondary mapping table.

2. A method in accordance with claim 1, wherein the persistent storage comprises flash memory.

3. A method in accordance with claim 1, further comprising updating the first mapping table in the persistent storage using the cached first mapping table during a time period when the first mapping table is not being utilized to access a location in the persistent storage.

4. A method in accordance with claim 1, further comprising storing in the cache storage at least one secondary mapping table.

5. A method in accordance with claim 4, further comprising evicting from the cache storage a secondary mapping table prior to storing in the cache storage the at least one secondary mapping table.

6. A method in accordance with claim 5, further comprising evicting from the cache storage a least frequently used secondary mapping table.

7. A method in accordance with claim 5, further comprising evicting from the cache storage a least recently used secondary mapping table.

8. A method for managing memory, the method comprising:
- persistently storing in persistent storage, a first mapping table and one or more secondary mapping tables for accessing the persistent storage, wherein the first mapping table comprises an index to a locations of each secondary mapping table stored in the persistent storage, wherein the first mapping table comprises information to determine the validity of each secondary mapping table, and wherein each secondary mapping table comprises an index to a location in the persistent storage;
- during an initialization of the persistent storage, determining if the first mapping table currently stored in the persistent storage is valid;
- if the first mapping table is valid, storing in cache storage the first mapping table;
- if the first mapping table is invalid, constructing the first mapping table; and
- storing in cache storage the constructed first mapping table.

9. A method in accordance with claim 8, wherein the persistent storage comprises flash memory.

10. A method in accordance with claim 8, further comprising, if the first mapping table is invalid, storing in the cache storage at least one of a list of available portions of the persistent storage and a list of reclaimable portions of the persistent storage.

11. A method in accordance with claim 8, further comprising, if the first mapping table is invalid:
- determining a respective location of each secondary mapping table stored in the persistent storage;
- determining a validity of each located secondary mapping table;
- determining available portions of the persistent storage; and
- constructing at least one secondary mapping table in accordance with the determined respective location of at least one secondary mapping table stored in the persistent storage, the determined validity of each located secondary mapping table, and the determined available portions of the persistent storage.

12. A method in accordance with claim 8, wherein the validity of the first mapping table is determined upon power being applied to the persistent storage using state information of a flash abstract layer.

13. A storage device comprising:
- a non-volatile memory having a mapping table persistently stored thereon, wherein the mapping table is used to access the non-volatile memory,
- wherein the mapping table comprises a first mapping table and one or more secondary mapping tables,
- wherein the first mapping table comprises a first index array to index to locations of each secondary mapping table stored in the non-volatile memory and a second index array to index locations of secondary tables stored in a cache storage, and a third array which contains information to determine the validity of each secondary mapping table stored in the persistent storage, and
- wherein each secondary mapping table comprises an index to a location in the non-volatile memory.

14. The storage device in accordance with claim 13, wherein the non-volatile memory comprises flash memory.

15. The storage device in accordance with claim 13, wherein the information of the third array comprises at least one sequence number corresponding, respectively, to each secondary mapping table, wherein a sequence number is indicative of a validity of a corresponding secondary mapping table.

16. The storage device in accordance with claim 13, the first mapping table further comprising an indication as to whether a portion of the non-volatile memory is dirty, wherein a dirty portion of the non-volatile memory is reclaimable.

17. The storage device in accordance with claim 13, each secondary mapping table further comprising a corresponding counter value indicative of a number of times the secondary mapping table has been accessed.

18. The storage device in accordance with claim 13, further comprising cache storage for storing a copy of the persistently stored first and second mapping tables.

19. The storage device in accordance with claim 13, wherein the storage device is a flash memory device.

* * * * *